UNITED STATES PATENT OFFICE.

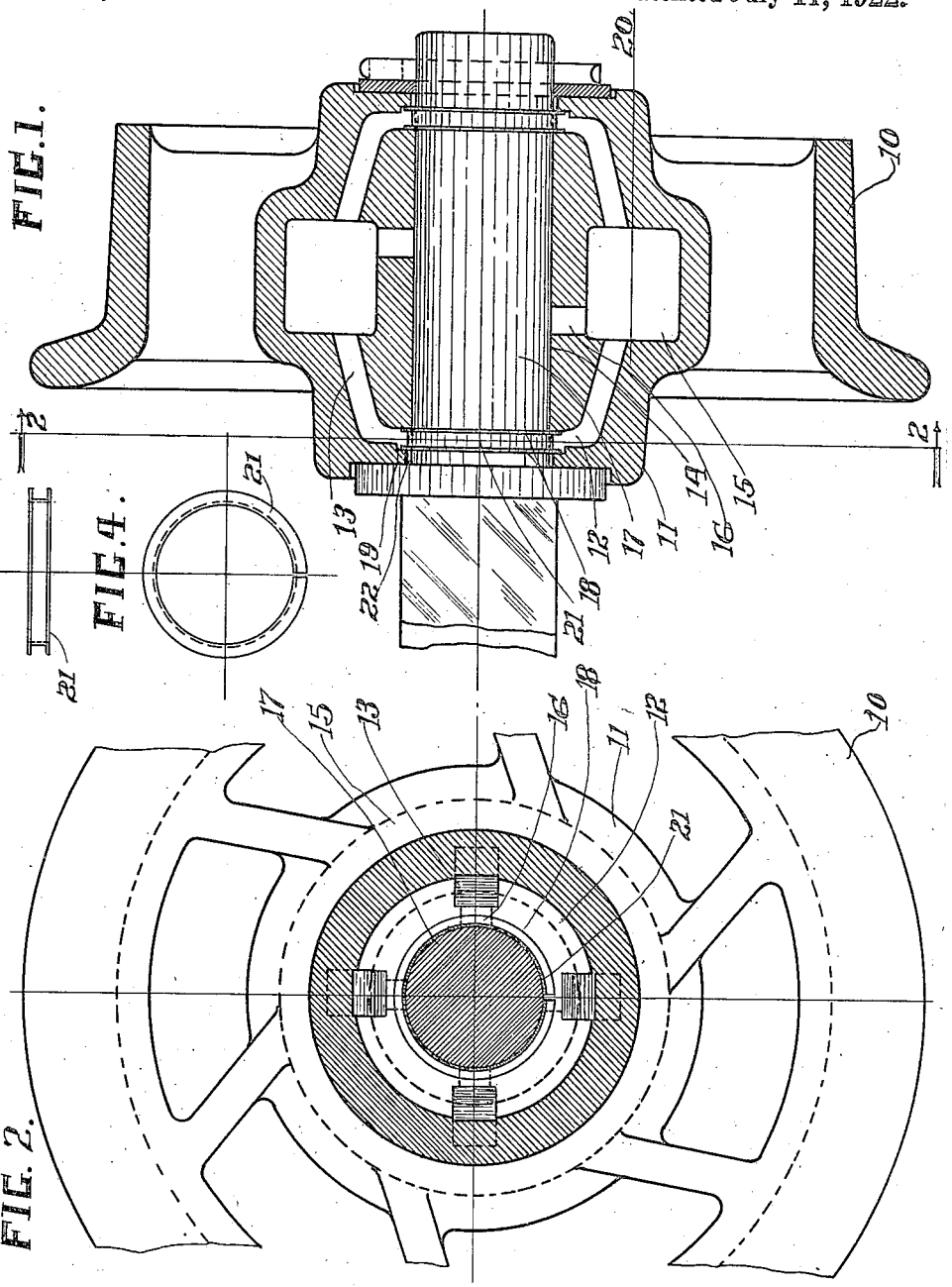

FREDERICK B. MILLER, OF SCOTTDALE, PENNSYLVANIA.

WHEEL.

1,422,597. Specification of Letters Patent. Patented July 11, 1922.

Application filed April 27, 1920. Serial No. 376,964.

*To all whom it may concern:*

Be it known that I, FREDERICK B. MILLER, a citizen of the United States, residing at Scottdale, in the county of Westmoreland and State of Pennsylvania, have invented certain new and useful Improvements in Wheels, of which the following is a full, clear, and exact specification.

This invention relates to wheels for various types of vehicles, and more particularly to lubricating means for such vehicles.

One object of my invention is to maintain a liberal supply of lubricant to the bearing portion of the wheel.

Another object is to prevent excessive waste of lubricant.

A further object is to provide a wheel the lubricant supply chamber and passageways of which are arranged to permit circulation of the lubricant.

These and other objects are accomplished by providing a wheel having communicating bearing and lubricant supply chamber, means for circulation of lubricant from one of said chambers to the other, and means of preventing the escape of lubricant from said chambers.

The invention is illustrated on the accompanying sheet of drawings in which:

Fig. 1 is a longitudinal sectional view in a vertical plane.

Fig. 2, is a transverse sectional view taken in the plane of line 2—2 of Fig. 1, showing lubricant retaining ring, passageways and lubricant supply chamber.

Fig. 3, is an end view of the lubricant-retainer ring.

Fig. 4, is an elevation of said lubricant-retainer ring.

The various novel features of my invention will be apparent from the description and drawings, and will be particularly pointed out in the appended claim.

While this invention finds particular application to car wheels for small cars and mine service, the invention is not limited to such cars and to such service.

The wheel 10, herein shown, has a hub 11 provided with annular and radially extending grooves 12, having a plurality of circumferentially spaced passageways 13 forming means of communicating between a bearing portion or chamber 14 and a lubricant supply chamber 15, both of which are formed within the hub 11. The ports 16 form means of communication between said lubricant supply chamber 15 to chamber 14. Located within the annular grooves 12, is a lubricant-retainer ring 21 which is adapted to engage around an axle 17, said lubricant-retainer ring having two annular and radially extending flanges 18. Surrounding one of said flanges is a counterbore 19.

In operation, assuming the lubricant supply chamber 15 is provided with an amount of lubricant not to exceed the level 20, the lubricant will flow through ports 16 into the bearing chamber 14 by reason of gravity of the lubricant and relative movement of the inside walls of the lubricant supply chamber when the wheel is in motion. Lubricant having circulated through the bearing chamber is deflected toward the periphery of the annular groove by a flange 18 of the lubricant retainer ring 21, after which it goes back to the lubricant supply chamber through the passageway 13. When the wheel comes to a state of rest, or at times the rotation is not great enough to keep the lubricant to the periphery of the annular groove, it is obvious the lubricant seeking its lowest level will fall between the flanges 18, which will prevent excessive amount of lubricant from escaping through the clearance 22.

There may be many modifications of the invention other than shown and described and it is my intention to cover all such modifications which do not involve a departure as set forth in the appended claim.

What I claim as new is:

A self-lubricating wheel with a hub, a bearing portion in the hub for receiving an axle, an annular groove in the hub surrounding the axle and adjacent to the end of the hub, said groove provided with a counterbore in the side of the groove adjacent to the end of the hub, a ring in the groove hugging around the axle, said ring having two outwardly extending flanges, one of said flanges concentric within the counterbore means by which a lubricant flows to the bottom or periphery of the groove communicating with the bearing portion.

In testimony whereof I affix my signature, in the presence of two witnesses.

FREDERICK B. MILLER.

Witnesses:
STEPHEN R. RUTHERFORD,
C. R. BOOKER.